United States Patent
Kim et al.

(10) Patent No.: US 6,256,310 B1
(45) Date of Patent: Jul. 3, 2001

(54) METHOD FOR CONTROLLING CALL UNDER USE OF ATM TRANSFER CAPABILITIES CALL GAP DURING OVERLOAD OF ATM SWITCHING NETWORK

(75) Inventors: Chul Soo Kim, Kongju; Hae Sook Kim; Byung Nam Yoon, both of Daejeon, all of (KR)

(73) Assignees: Electronics and Telecommunications Research Institute, Daejeon; Korea Telecom, Seoul, both of (KR)

( * ) Notice: Subject to any disclaimer, the term of this patent is extended or adjusted under 35 U.S.C. 154(b) by 0 days.

(21) Appl. No.: 09/136,715

(22) Filed: Aug. 19, 1998

(30) Foreign Application Priority Data

Dec. 22, 1997 (KR) .................................................. 97-71648

(51) Int. Cl.[7] ............................. H04L 12/28; H04L 12/56
(52) U.S. Cl. ........................................... 370/395; 370/230
(58) Field of Search ................................... 370/395, 229, 370/230, 231, 232, 233, 234, 235, 252, 253, 341, 356, 359, 360, 396, 398, 419, 420, 439, 442, 443, 444, 455, 462, 463

(56) References Cited

U.S. PATENT DOCUMENTS

| | | | | |
|---|---|---|---|---|
| 5,548,533 | * | 8/1996 | Gao et al. ............................. | 709/235 |
| 5,594,717 | | 1/1997 | Watanable et al. ................... | 370/232 |
| 5,629,930 | | 5/1997 | Beshai et al. ......................... | 370/396 |
| 5,818,818 | * | 10/1998 | Soumiya et al. ...................... | 709/224 |
| 5,878,224 | * | 3/1999 | Smith .................................... | 379/137 |
| 5,881,137 | * | 3/1999 | Ginzboorg et al. ................... | 370/232 |
| 5,933,481 | * | 8/1999 | MacDonald ........................... | 370/414 |
| 6,046,981 | * | 4/2000 | Ramamurthy et al. ............... | 370/252 |
| 6,175,570 | * | 1/2001 | Cukier et al. ......................... | 379/113 |

* cited by examiner

Primary Examiner—Dang Ton
Assistant Examiner—Phirin Sam
(74) Attorney, Agent, or Firm—Cohen, Pontani, Lieberman & Pavane

(57) ABSTRACT

A method for controlling call under use of ATM transfer capabilities call gap during the overload of an ATM switching network. The method comprises the steps of accepting a high priority call need first by means of call priority in a given time gap; and accepting the call in an order of DBR, SBR, ABR (ABT), and UBR service, in case that the call priority is the same, or in case that there is no call priority.

1 Claim, 3 Drawing Sheets

METHOD FOR CONTROLLING CALL UNDER USE OF ATM TRANSFER CAPABILITIES CALL GAP DURING OVERLOAD OF ATM SWITCHING NETWORK

BACKGROUND OF THE INVENTION

1. Field of the Invention

The present invention relates to a method for controlling call under use of ATM (Asynchronous Transfer Mode) transfer capabilities call gap during the overload of an ATM switching network. In particular, the present invention relates to the method for controlling call under use of the ATM transfer capabilities call gap during the overload of the ATM switching network, wherein there is applied to the overload of the network a call control algorithm which is capable of providing maximum benefits to a network businessman in view of a fact that service charges added are different depending upon the ATM transfer capabilities requested by a user.

2. Description of the Prior Art

The PSTN (Public Switch Telephone Network) according to the prior art has have two call control methods, i.e., a percentage based method and a call gapping method. The percentage based method is to connect only some percentage out of calls made in a specific time to the user, since the bandwidth needed in calls are all the same. The call gapping method is to connect services made in the specific time. For example, when the network is under congestion, the percentage based method is to accept the service needed per unit time by percentage designated by an operator. The call gaping method is to accept only one call in a given call gap, i.e., one second, 2.5 seconds.

SUMMARY OF THE INVENTION

Therefore, an object of the present invention is to provide a method for controlling call under use of ATM transfer capabilities call gap during the overload of an ATM switching network in which there is applied during the overload of the network call control algorithm which is able to provide maximum benefits to a network businessman, in view of a fact that service charges added is different according to the ATM transfer capabilities.

Additional features and advantages of the invention will be set forth in the description which follows, and in part will be apparent from the description, or may be learned by practice of the invention. The objective and other advantages of the invention will be realized and attained by the structure particularly pointed out in the written description and claims hereof as well as the appended drawings.

To achieve the above object in accordance with the present invention, as embodied and broadly described, the method for controlling call under use of the ATM transfer capabilities call gap during the overload of the ATM switching network comprises the steps of accepting a high priority call need first by means of call priority in a given time gap; and accepting the call in an order of DBR, SBR, ABR (ABT), and UBR service, in case that the call priority is the same, or in case that there is no call priority.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Figure 1:
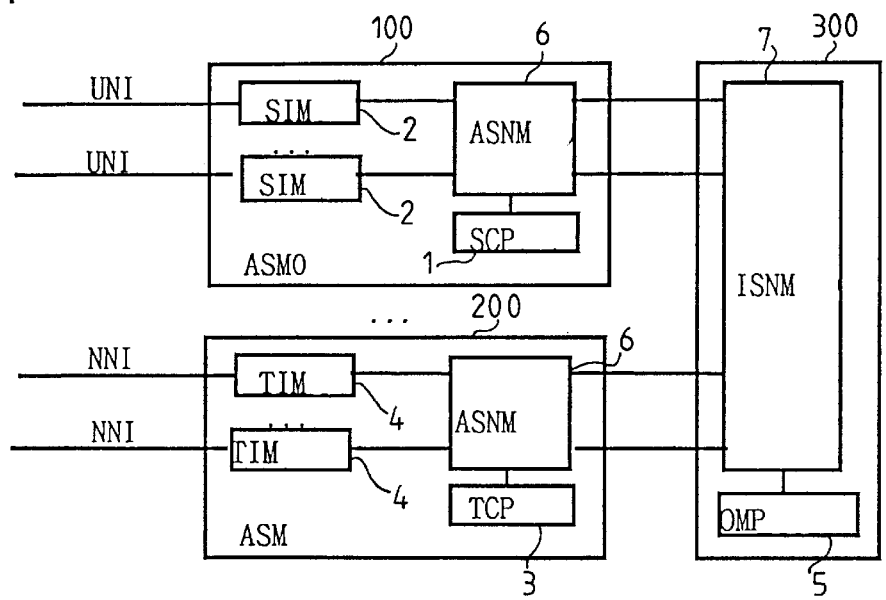
FIG. 1 is a schematic of an ATM VP switching system explaining the embodiment of the present invention.

Reference will now be made in detail to the preferred embodiments of the present invention, examples of which are illustrated in the accompanying drawings.

In general, the basic purpose of a broadband communication is to integrate all services ranging from band communication services and narrow broadband communication services. The broadband communication services perform image telephone call, dynamic picture image videotext, video inquire, telefax, color facsimile, HDTV, and Hi-fi division. And, the narrow band communication services implement remote control detection, data terminal, telewriting, telephone, facsimile, and packet communication.

To provide various services, an ATM was selected in ITU-T type. As a packet (cell) transfer mode having a fixed length, the ATM can enhance the efficiency of the network by statistically multiplexing burst traffic mixed heterogeneously.

In accordance with the ATM, there are provided some merits. First of all, the ATM is so adaptable for a band assignment through a virtual connection of the packet having fixed length based on a service need. Secondly, in the ATM, the bandwidth can be effectively used by statistically multiplexing burst traffic according to cell damage and cell delay.

In the meantime, the ATM transfer capabilities mean to call a B-ISDN service a transfer characteristic in an ATM layer. The ATM transfer capabilities are expressed as an ATM layer service model and a QOS requested by the user. The ATM transfer capabilities defined in the current ITU-T, are divided into a DBR (Deterministic Bit Rate), a SBR (Statistical Bit Rate), an ABR (Available Bit Rate), an ABT (ATM Block Transfer), and an UBR (Unspecified Bit Rate).

The SBR includes a service in which the amount of data can be changed during its transfer, and is directed to compressible all services related to image data like HDTV or image telephone. In this case, there can be effects on the network capabilities such as the amount of average data, the amount of peak data, peak duration, and the number of peaks per unit time. The DBR in which data is to be transferred/received have a stable data transfer rate, and is directed to services in which the data transfer rate between the service start and the service end is the same.

The DBR indicates a service when the PSTN has a telephone service of 64 Kbps. If all services are of voices in the B-ISDN, the control algorithm is the same as that of the PSTN during the overload of the switching system. This results from the fact that there is no difficulty in taking the call service during congestion of the network, assuming that internal factors in the system are all eliminated and only the DBR service is accepted in the network.

In the ABR service, since the burst of traffic is large and variable, it is difficult to expect input traffic. In addition, the ABR service has a characteristic sensitivity to cell damage, not cell delay, during the transfer of the cell. The ABR service can be applied to a file transfer or an internet service. In the ABR service, the data transfer rate in each terminal is variable according to the network state, but it is not affected by the QOS even when the transfer rate is changed.

The ABT service has a characteristic to transmit the data transfer rate assigned from the network through a RM (Resource Management) cell. Also, the ABT service is similar to the ABR service in that the data transfer rate is variable depending upon the network state, but it negotiates the bandwidth with the network by the ATM block having constant size. And, the ABT service has the same characteristic as that of the DBR in a BCR (Block Cell Rate). This means that the data is equally transferred in the block with respect to the transfer rate negotiated with the network under use of the RM cell.

On the other hand, in the bandwidth having a specific link, the bandwidth obtained by subtracting the fixed bandwidth occupied by the DBR service from the variable bandwidth occupied by the SBR service, is included in the ABR, ABT, and UBR services. As mentioned above, in the ABR, ABT, and UBR services, a designation terminal before transfer is provided with an occupiable real one out of spare bandwidths of the network through the RM cell. Then, when the provided bandwidth is again transferred to the designation terminal through a receiving terminal, data corresponding to the bandwidth is transmitted.

Therefore, there is a difference between the spare bandwidth assigned when the RM cell is received from the network, and the network situation when the real terminal transmits the data, so that a part of bandwidth can remain, or can be short. In case the bandwidth is short, the switching system must be designed to protect the cell damage by putting a buffer by the number of allowable bandwidths.

On the other hand, if the bandwidth remains, the spare bandwidth is assigned to the UBR service. The UBR service is buffered by the switching system when there is the spare bandwidth in the network.

Figure 3:
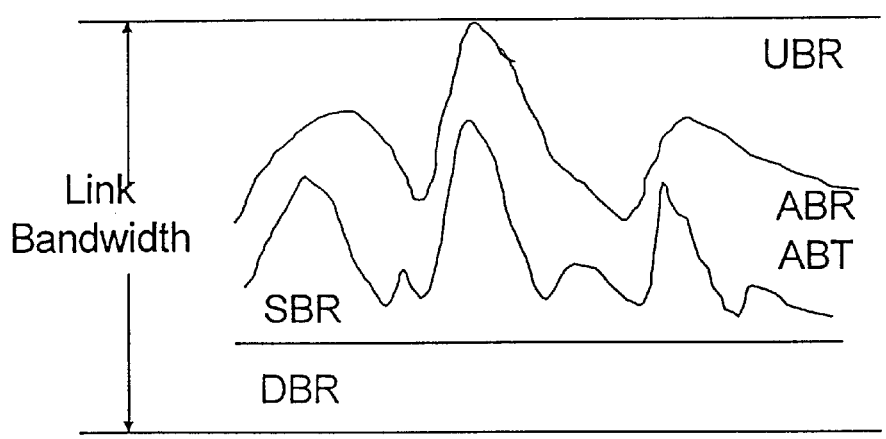
FIG. 3 is a view illustrating bandwidth of ATM transfer capabilities.

As shown in FIG. 3, the bandwidth in the DBR service is fixed, and the same one in the SBR service is changed as time goes by. In the ABR and ABT services, other bandwidth to be used next is assigned when the bandwidth remaining after use in the SBR service is fed back after the RM cell transfer, so that the services are available for using the bandwidth of the network which is changeable.

Also, the service is proper to E-mail service in which there is scarcely real time, and also to the other service in which a "terminal to terminal" flow can be satisfactorily controlled. The network congestion indicates such as a situation that the switching system can't satisfy the negotiated QOS already set up because of the overload of overload control source, and also respond to a new connection request.

When a natural disaster occurs, or when call service is integrated into its own switching station because of the domino phenomenon that occurs in case of the breakdown of the specific switching station, network congestion or overload in the switching system could be caused. Also, if the traffic is integrated into the specific station due to occurrence of something unexpected, network congestion or overload in the switching system can also occur. In the meantime, even though the operator of the switching system can expect the congestion of call service in the specific time, if there is not taken a special measurement in the switching system, overload and network congestion can be still generated.

In addition, in case that the call service is congested by the specific designation, most of the system is overloaded by losing connection admission control capability because the calls made exceed the capability the system is designed to accept. Or, even though a lot of calls are made, the system responds to calls corresponding to one less than its own capability and at last the system goes down. If such as a situation continues, the system congestion caused by the specific call service affects a corresponding switching system or an adjacent switching system, so that the overall network is considerably affected. The network congestion in the B-ISDN, as mentioned above, is divided into a cell level and a cell connection level. The cell level congestion means that the cells instantaneously transferred from the terminals are multiplexed and then inputted to a specific port by the number of cells which are over an allowed value.

Accordingly, the present invention is directed to the overload of the connection level of the switching system. The basic idea of the present invention is an algorithm applied during the overload of the network by means of call control algorithm which can guarantee a network businessman to have the maximum benefit, in view of the fact that each service charge added is different according to the ATM transfer capabilities requested by the user.

That is, when some user wants to send data at 100M, if the user uses the DBR transfer capabilities, the switching system reserves a maximum data transfer rate in as advance. This means that the data transfer is completely (100 percent) performed, if the system is not down. In case of the SBR service, the switching system generally guarantees the maximum transfer rate as same as the SBR service, without reserving it.

Thus, if all or a part of subscribers use the maximum transfer rate, or if the data is instantaneously inputted, part of the data could be lost. On the other hand, the ABR service or the ABT service are not affected by the data delay time. However, in the ABR or ABT service, it takes long time to transfer data because the data transfer rate is controlled according to the network situation.

In case of using the UBR service, its service charge is the cheapest because the UBR service does not guarantee any QOS. When the same amount of data is transmitted, their service charges are numbered in the order of DBR, SBR, ABR (ABT), and UBR. The method for controlling call under use of the ATM transfer capabilities is to accept high priority call needs first, since all service needs from the user can not be accepted during network congestion. In accordance with the method, if the call service priority is at the same level, or if there is no call service priority, the network businessman accepts the call service need designated in the high cost production service, so that the benefit to the network businessman can be maximum.

FIG. 1 is a schematic view of an ATM VP switching system explaining the embodiment of the present invention.

As shown in FIG. 1, as a processor for performing call process of a general subscriber using an UNI protocol, a Subscriber Call Processor (SCP) 1 performs overall traffic control like call admission control and a usage parameter control (UPC), together with a subscriber interface module SIM 2. A trunk call processor (TCP) 3 implements call connection control for both of input and output interface, together with a trunk interface module (TIM) 4 for performing call processing with the network using the NNI protocol. Also, the TCP 3 manages all functions required in the matching with the network. An operation and maintenance processor (OMP) 5 performs functions such as a series of operations and maintenance in the system. This is, the functions include overcharge performance, statistics, maintenance, and operation management.

An access switch magnetic network module ASNM 6 performs a line concentration function having line concentration ratio according to the construction of the system, and also transfers the cell being the basic unit of the ATM. An interconnection switch network ISNM 7 is a magnetic routing switch to be used as an interconnector between the ASMs.

The ATM transfer capabilities have a service characteristic requested by the user. It is divided into the DBR, SBR, ABR, and UBR. The DBR is the service in which the bandwidth is not changed during the performance of the service, and sound service is generally included in the DBR service. The SBR has the bandwidth changeable during the performance of the service and its bandwidth is determined by data compression during the performance thereof, like image data. The ABR is the service to control the data transfer rate by means of the switching system, like computer communication. At last, in the UBR service, the data delay does not affect the data transfer at all. When the network is congested, if the user of the UBR service wants to make data transfer cancellation, the UBR service does not send any data on it. The difference between the ABR service and the UBR service is in the data transfer. In other words, when the network is congested, the ABR service transfers data, even though it is so minute. But, the UBR service does not transmit any data to the user. However, they are similar in that they are all computer data transfer services.

Figure 4:
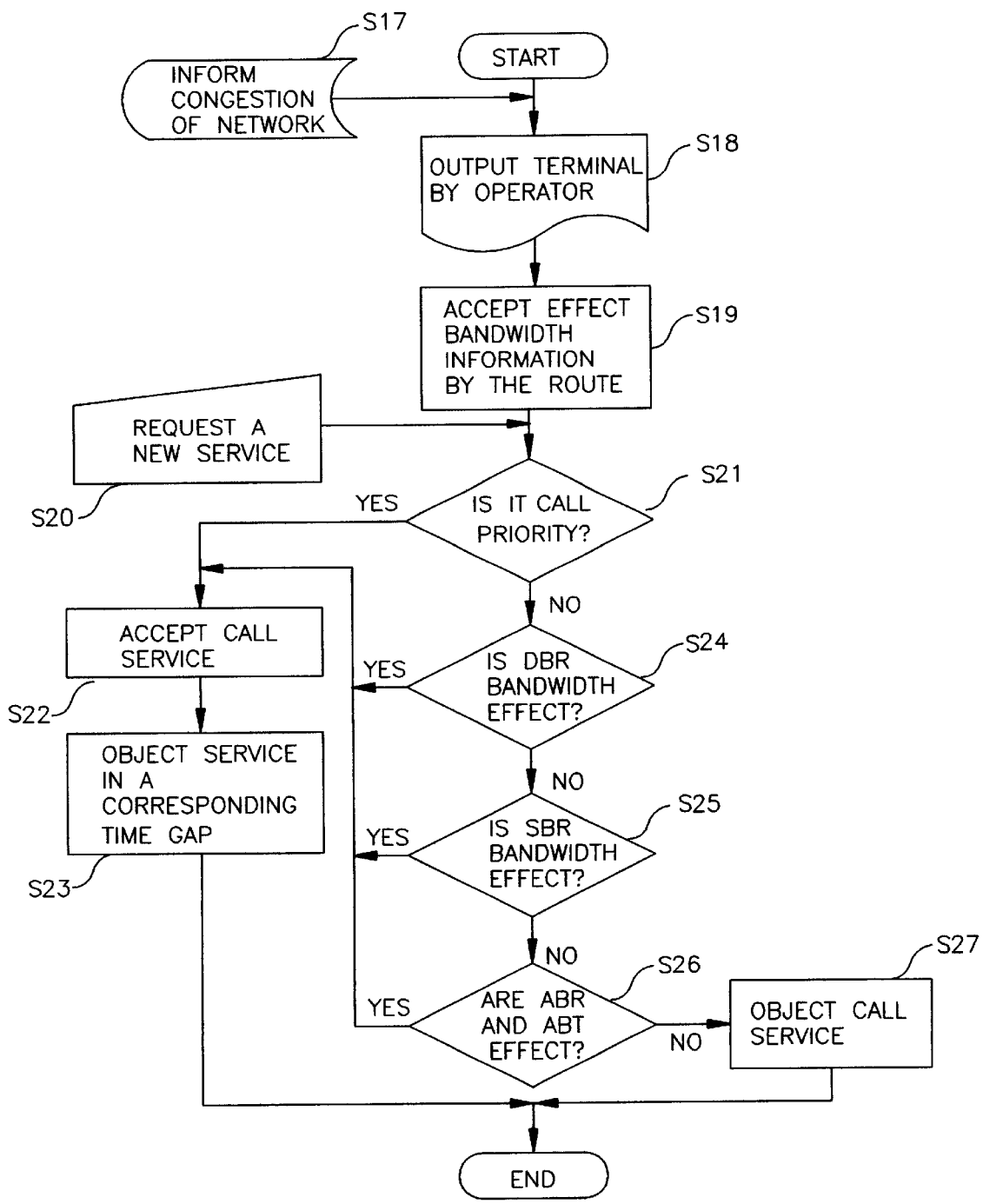
FIG. 4 is a flow diagram illustrating call control method under use of ATM transfer capabilities information.

As shown in FIG. 4, in order to efficiently use the bandwidth of the network, there is mixed the ATM transfer capability information required by the user. On the other hand, when the network is congested, the DBR service keeps the bandwidth assigned, but the SBR service might abandon the call of the other service because the bandwidth having a great change is transferred to the maximum cell. Therefore, in the UBR service, the user can send the data by the cell ratio ranging from 0 to a maximum value that the user wants to have according to the network situation. In the ABR service, the user can send the data by the cell ratio ranging from a minimum value to a maximum value determined by the user.

Figure 2:
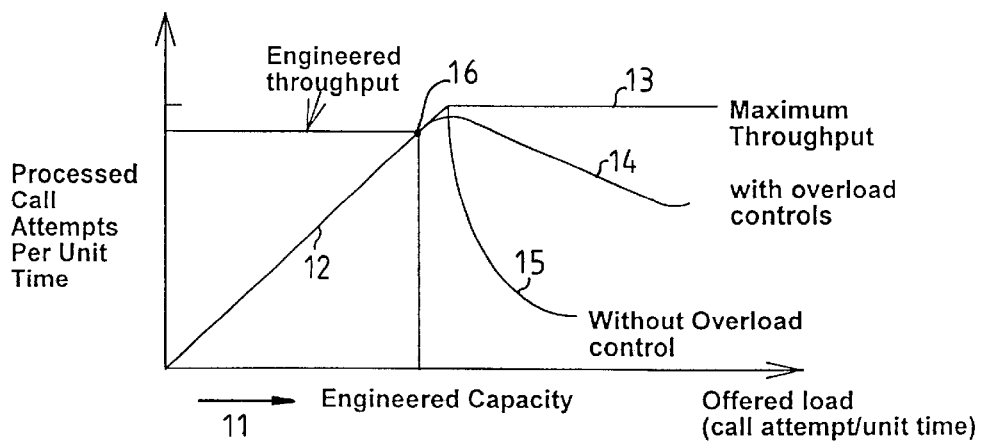
FIG. 2 is a view illustrating network capabilities for load occurring in the system during the overload thereof.

FIG. 2 is a view illustrating network capabilities for load occurring in the system during the overload.

As shown in FIG. 2, as the call is congested, the overload of the system is linearly increased. However, if the call need exceeds the capability to be accepted, it must be theoretically processed like a reference 13 shown in FIG. 2. But, if there is no overload control function like a reference 15 shown in FIG. 2, the call processed is rapidly reduced like a reference 15 in FIG. 2. Normally, an overload control point 16 can be different in the system.

As shown in FIG. 4, during the overload of the system, if the system under operation is congested, or if the network connected to the system is under congestion, the is user informed of such fact through a system console. On the other hand, if the system is congested, the other party controls the service designated by its own system, and if the other system connected to its system is under congestion, the service from the corresponding switching station is controlled. At this time, the call accepted during the specific time begins to control the bandwidth and the ATM transfer capabilities information.

In accordance with the present invention, the method is to accept the high priority call need based on the call priority. Then, the service after the corresponding time gap is objected. Also, even in the case that the call priority is the same, or that it can not be determined, the network businessman thinks about the call priority and accepts the high priority call to thereby make the benefit maximum.

In the DBR, the service requested by the user is processed according to the ATM transfer capabilities information. If the requested bandwidth is smaller than an effect bandwidth, the call is accepted. If it is not, the process returns to a step 20. In the same manner, in the SBR, if the requested bandwidth is smaller than the effect bandwidth, the call is accepted. If it is not, the process returns to a step 20. The manner is equally applied to the ABR and ABT service.

The algorithm in accordance with the present invention can allow the network business to have maximum benefits even in a situation where the network is congested.

Accordingly, in the present invention, in case of the natural disaster, of the breakdown of the specific switching station, and of something unexpected, if the call request service is integrated into the specific switching station, the high priority call is first accepted. And, the network businessman accepts the high priority call in the same data transfer, so the benefit of the network businessman becomes maximum. The method of the present invention maximizes the network use depending upon the ATM transfer capabilities information. Also, the method in accordance with the present invention performs the request of the user during the overload of the system by using the algorithm which makes the call priority capable of maximizing the benefit of the network businessman.

It will be apparent to those skilled in the art that various modifications and variations can be made in the method for controlling call of the present invention without departing from the spirit or scope of the invention. Thus, it is intended that the present invention cover the modifications and variations of this invention provided they come within the scope of the appended claims and their equivalents.

What is claimed is:

1. A method for controlling a call using asynchronous transfer mode (ATM) transfer capabilities of an ATM switching network during an overload of the ATM switching network to maximize the benefit to a network administrator, the method comprising the steps of:

determining whether a call has a higher priority than other calls placed during a time interval;

accepting the call before the other calls if the call has a higher priority than the other calls; and if the call does not have a higher priority than the other calls, accepting the call in an order of deterministic bit rate (DBR) service, statistical bit rate (SBR) service, one of available bit rate (ABR) and ATM Block Transfer (ABT) services, and unspecified bit rate (UBR) service.

* * * * *